(12) United States Patent
Stephens

(10) Patent No.: US 11,485,241 B2
(45) Date of Patent: Nov. 1, 2022

(54) EFFICIENT COMPUTING IN VEHICLES

(71) Applicant: CORE SCIENTIFIC, INC., Bellevue, WA (US)

(72) Inventor: Benjamin Flint Stephens, Seattle, WA (US)

(73) Assignee: Core Scientific, Inc., Bellevue, WA (US)

( * ) Notice: Subject to any disclaimer, the term of this patent is extended or adjusted under 35 U.S.C. 154(b) by 327 days.

(21) Appl. No.: 16/659,051

(22) Filed: Oct. 21, 2019

(65) Prior Publication Data

US 2021/0114472 A1 Apr. 22, 2021

(51) Int. Cl.
| | | |
|---|---|---|
| *B60L 53/14* | (2019.01) | |
| *B60W 10/26* | (2006.01) | |
| *B60W 10/08* | (2006.01) | |
| *B60L 53/12* | (2019.01) | |
| *B60W 10/06* | (2006.01) | |
| *G01C 21/34* | (2006.01) | |
| *B60W 20/00* | (2016.01) | |

(52) U.S. Cl.
CPC .............. *B60L 53/14* (2019.02); *B60L 53/12* (2019.02); *B60W 10/06* (2013.01); *B60W 10/08* (2013.01); *B60W 10/26* (2013.01); *B60W 20/00* (2013.01); *G01C 21/3469* (2013.01)

(58) Field of Classification Search
CPC .. B60L 53/14; B60L 53/12; B60L 7/10; B60L 50/15; B60L 50/60; B60L 53/64; B60L 58/13; B60L 2240/642; B60W 10/06; B60W 10/08; B60W 10/26; B60W 20/00; B60W 2510/244; B60W 2530/209; B60W 50/06; G01C 21/3469; Y02T 10/70; Y02T 10/7072; Y02T 10/72; Y02T 90/12; Y02T 90/14; Y02T 90/16; Y02T 90/167; Y04S 30/14
USPC ......................................................... 320/109
See application file for complete search history.

(56) References Cited

U.S. PATENT DOCUMENTS

| | | |
|---|---|---|
| 7,516,360 B2 | 4/2009 | Bacher et al. |
| 7,730,456 B2 | 6/2010 | Okawa et al. |
| 9,063,738 B2 | 6/2015 | Jain et al. |
| 9,201,686 B2 | 12/2015 | Dey et al. |
| 11,108,856 B2 | 8/2021 | Chong |
| 2007/0083778 A1 | 4/2007 | Nagano |
| 2007/0204626 A1* | 9/2007 | Pan ................... F25B 21/02 62/3.2 |
| 2011/0145380 A1 | 6/2011 | Glikson et al. |

(Continued)

OTHER PUBLICATIONS

Iyer, Kavita; Tesla Model S Owner Hacks His Vehicle To Mine Cryptocurrency for Free, Dec. 2017 https://www.techworm.net/2017/12/tesla-model-s-owner-hacks-vehicle-mine-cryptocurrency-free.html.

(Continued)

*Primary Examiner* — Yi-Kai Wang
(74) *Attorney, Agent, or Firm* — Fishman Stewart PLLC

(57) ABSTRACT

A system and method for efficient (e.g., economical) computing in hybrid, plug-in hybrid, and electric vehicles is disclosed. A compute manager is configured to receive and schedule compute tasks for execution on computing cores in the vehicle to increase the usage of recaptured energy that would otherwise be wasted due to battery limitations.

(Continued)

Vehicle status information such as current battery charge level and current route may be used to determine whether compute tasks can be beneficially executed.

20 Claims, 8 Drawing Sheets

(56) References Cited

U.S. PATENT DOCUMENTS

| | | | |
|---|---|---|---|
| 2015/0106001 A1* | 4/2015 | Lee | G01C 21/3626 |
| | | | 701/123 |
| 2017/0361727 A1 | 12/2017 | Miftakhov et al. | |
| 2018/0039519 A1 | 2/2018 | Kumar et al. | |
| 2018/0339601 A1 | 11/2018 | Kruszelnicki | |
| 2019/0016419 A1 | 1/2019 | Sheldon-Coulson et al. | |
| 2019/0193569 A1* | 6/2019 | Oh | B60W 40/107 |
| 2020/0234178 A1 | 7/2020 | Florez Choque et al. | |
| 2020/0284599 A1* | 9/2020 | Cyr | G01C 21/3469 |
| 2021/0064445 A1 | 3/2021 | Minehan | |
| 2021/0114472 A1 | 4/2021 | Stephens | |

OTHER PUBLICATIONS

Mitchell, Eddie; "Startup Launches Blockchain Powered Electric Vehicles That Mine Cryptocurrency" Sep. 2018 https://cointelegraph.com/news/startup-launches-blockchain-powered-electric-vehicles-that-mine-cryptocurrency.

Blenkinsop, Connor; "Portal Allows You To Buy Altcoins Using Fiat, Without Converting To Bitcoin or Ethereum First" Jan. 2019 https://cointelegraph.com/news/portal-allows-you-to-buy-altcoins-using-fiat-without-converting-to-bitcoin-or-ethereum-first.

Buntnix, JP; "The Future of Crypto Mining May Involve Electric Vehicles" Sep. 2019 https://nulltx.com/the-future-of-crypto-mining-may-involve-electric-vehicles/.

Blewit, Richard Tyr; "Is Mining Cryptocurrency in the Boot of Your Electric Car a Good Idea? No" Dec. 2017 https://www.neowin.net/news/is-mining-cryptocurrency-in-the-boot-of-your-electric-car-a-good-idea-no.

"A clever Tesla owner is using his Model S to mine cryptocurrency for free," Nov. 30, 2017, <https://thenextweb.com/news/tesla-model-s-cryptocurrency-free>, accessed Apr. 20, 2022.

* cited by examiner

EFFICIENT COMPUTING IN VEHICLES

TECHNICAL FIELD

The present disclosure generally relates to the field of computing and, more particularly, to a system and method for efficiently executing computational workloads in mobile environments such as electric and hybrid vehicles or other vehicles that have the ability to generate power from otherwise unused kinetic energy.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Advances in manufacturing, battery chemistry, mechanical design, and electronics engineering have enabled new classes of vehicles such as electric and hybrid cars, buses and trucks. Some of the main benefits of these vehicles include their [smaller carbon footprint] and increased efficiency relative to ICE (internal combustion engine) only vehicles. This increased efficiency is mainly attributable to their ability to be at least partially propelled by efficient electrical motors powered by rechargeable batteries.

To further decrease reliance on fossil fuel and [increase efficiency], these motors are often implemented as motor-generators that upon braking are capable of converting a part of the vehicle's kinetic energy into electrical energy that is stored in the vehicle's battery. ICE-only vehicles typically waste this kinetic energy from braking and merely heat up the vehicle's brakes.

Unfortunately, the batteries used by electric and hybrid vehicles have capacity limits due to their cost, volume and weight. Once the limited battery capacity is full, any additional kinetic energy that could be captured from braking/coasting is generally wasted. In addition to batteries and motor-generators, many newer versions of these electric and hybrid vehicles also include significant computing power in the form of multiple processing cores that can quickly process data from sensors like cameras in order to enable features like self-parking, energy management, navigation, and collision avoidance.

The batteries and processing cores contribute in part to the higher cost of these vehicles relative to ICE-only vehicles. For at least these reasons, there is a desire for a solution to increase the efficiency and utility of these new electric and hybrid vehicles during their lifecycle and improve their ability to capture and utilize energy that would otherwise be wasted.

SUMMARY

For at least the reasons outlined above, there is demand for a vehicle, system, and method that utilizes potentially wasted energy in hybrid and electric vehicles to efficiently perform compute tasks. In one embodiment, a vehicle capable of such efficient computing comprises a battery and an electric motor generator configured to propel the vehicle during acceleration and to charge the battery during braking. The vehicle may further comprise one or more computing cores, a network interface and a compute manager that receives compute tasks that are not related to the vehicle's operation and causes the computing cores to execute the compute tasks if the battery charge level exceeds a predetermined threshold. The compute tasks may comprise blockchain proof of work calculations or other beneficial computing tasks. In this way, the system is more efficient (e.g., economical) because energy that is normally wasted due to battery capacity limits can put to beneficial use generating value for the user. By using energy that is normally wasted, in some embodiments and situations the system may also be more environmentally friendly than performing the compute tasks exclusively using grid power (which might be generated from fossil fuels).

In one embodiment, the compute manager may be configured to determine a current route for the vehicle and determine whether the battery's charge level will exceed the predetermined threshold based on the current route. If the predetermined threshold will be exceeded without executing the compute task, it may cause the computing cores to execute. The compute manager may also be configured to determine whether the current route ends in a destination that is a charging point for the vehicle and cause the computing cores to execute the compute task if the battery has excess charge beyond that needed to propel the vehicle to the current route end point.

In another embodiment, the compute manager may determine a predicted reward for completing the compute task, determine a predicted incremental fuel cost for completing the compute task based on a current location of the vehicle, and cause the computing cores to execute the compute task if the predicted reward exceeds the predicted fuel cost. The compute manager may communicate with a management server that selects the compute tasks for transmission to the compute manager, and the compute manager may be configured to transmit results for the compute task to the management server. The compute manager may prevent the computing cores from executing the compute task if the vehicle has below a predetermined threshold of fuel, if a current temperature associated with the vehicle is above or below a predetermined range, or if the vehicle is set to a high-performance mode.

A computing system for efficient mobile computational processing in an electric or hybrid vehicle having a motive battery is also contemplated. In one embodiment, the system may comprise a plurality of computing cores, a network interface, and a compute manager. The compute manager may be configured to receive compute tasks not related to the vehicle's operation from the network interface and instruct the computing cores to execute the compute task if a charge level of the motive battery exceeds a predetermined threshold. The compute manager may be configured to determine or predict a current route for the vehicle and whether the battery's charge level will exceed the predetermined threshold based on the current route. The compute manager may cause the computing cores to execute the compute task if the predetermined threshold will be exceeded without executing the compute task.

A method for efficient computing in an electric or hybrid vehicle is also contemplated. In one embodiment, the method comprises receiving a compute task from a network that is external to the vehicle, determining if the vehicle's battery is above a predetermined threshold level of charge, executing the compute task on the compute cores if the vehicle's battery is above the predetermined threshold level of charge, and transmitting the results of the compute task to the network.

The method may further comprise selecting the compute task from a plurality of blockchain networks based on a predicted reward. A current route for the vehicle may be determined. A determination of whether or not the battery's charge level will exceed the predetermined threshold on the current route can also be made. If the predetermined threshold will be exceeded without executing the compute task (e.g., the battery's maximum capacity will be exceeded), then the computing cores may execute the compute task to make beneficial use of the potentially wasted energy.

In one embodiment, the method may further comprise determining whether the current route ends in a destination that is a charging point for the vehicle, and causing the computing cores to execute the compute task if the battery has excess charge beyond that needed to propel the vehicle to the current route end point. An estimated reward for completing the compute task may also be determined along with a current estimated fuel cost (based on the current location or route of the vehicle) to perform the compute task. In one embodiment, the compute task may be performed if the estimated reward is greater than the current estimated fuel cost. The estimated fuel cost may include electricity cost for pure electric vehicles and plug-in hybrid vehicles, or gasoline or diesel for hybrids with ICE.

In some embodiments, the compute tasks are received from a management server, and a result for the compute task is transmitted to the management server. The computing cores may be prevented from executing the compute task if the vehicle has below a predetermined threshold of fuel, if the current measured temperature is above or below a predetermined range, or if the vehicle has a performance mode that is set to a high-performance mode.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Figure 1:
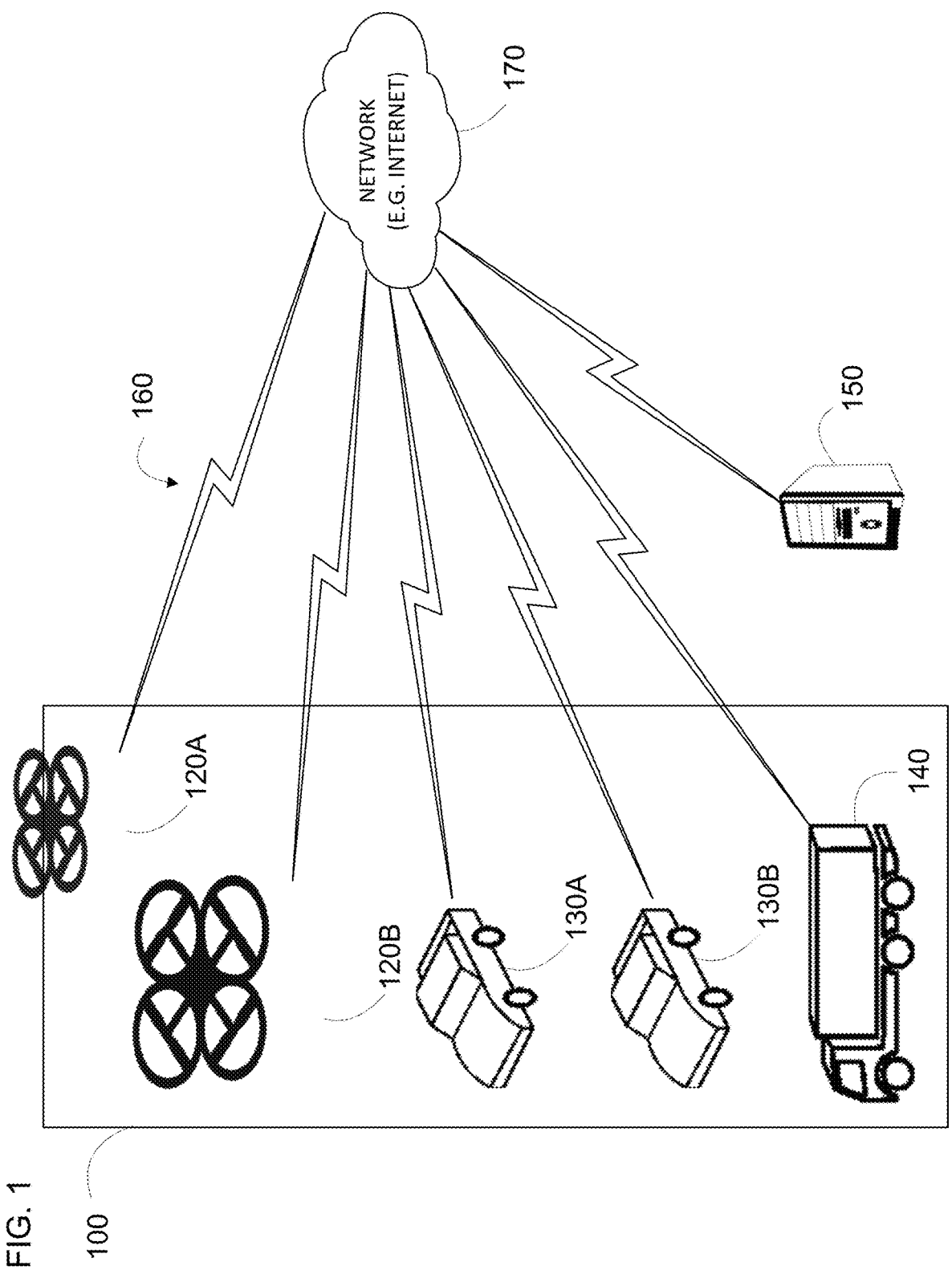
FIG. 1 is an illustration of one example of a system for harvesting remnant cycles in smart devices according to teachings of the present disclosure.

Referring now to FIG. 1, an example embodiment of a system for harvesting remnant cycles in embedded smart mobile devices is illustrated. The system includes one or more smart devices 100. The smart devices 100 may comprise, for example, one or more intelligent drones 120A-B, one or more autonomous vehicles such as self-driving cars 130A-B and self-driving truck 140. Each of smart devices 100 are coupled via network connections 160 to a communications network 170. Network connections 160 are preferably wireless network connections, e.g., Wi-Fi (IEEE 802.11), 4G, 5G, but wired connections are also possible when the smart devices 100 are stationary (e.g., when idle and parked or docked for charging). Network 170 is preferably the Internet, but other networks are possible, including private local area networks (LAN) or wide area networks (WAN), virtual private networks (VPNs), or secure overlay networks running over the Internet or other WAN. Management server 150 is also connected to network 170 via network connections 160 and is able to communicate with smart devices 100.

As described in greater detail in connection with FIG. 2 below, smart devices 100 may include sensors and processing power enabling autonomous or semi-autonomous operation. For example, smart devices 100 may include high resolution cameras and numerous processors capable of performing various real-time or near real-time image processing operations (e.g., edge finding, object detection) that are useful for self-parking, self-navigation and collision avoidance. As noted above, this significant processing power can increase the cost of smart devices 100 and yet typically remains unused or under-utilized for significant periods of time when smart devices 100 are idle (e.g., docked or plugged-in for charging, or even when fully charged and simply waiting to be used). The example system illustrated in FIG. 1 is configured to improve this situation by having management server 150 select and distribute viable processing tasks via network connections 160 and network 170 to smart devices 100 when they are idle. With this system and method, owners of smart devices 100 may receive greater value from smart devices 100 and in some cases potentially offset some of the purchase or lease cost.

Figure 2:
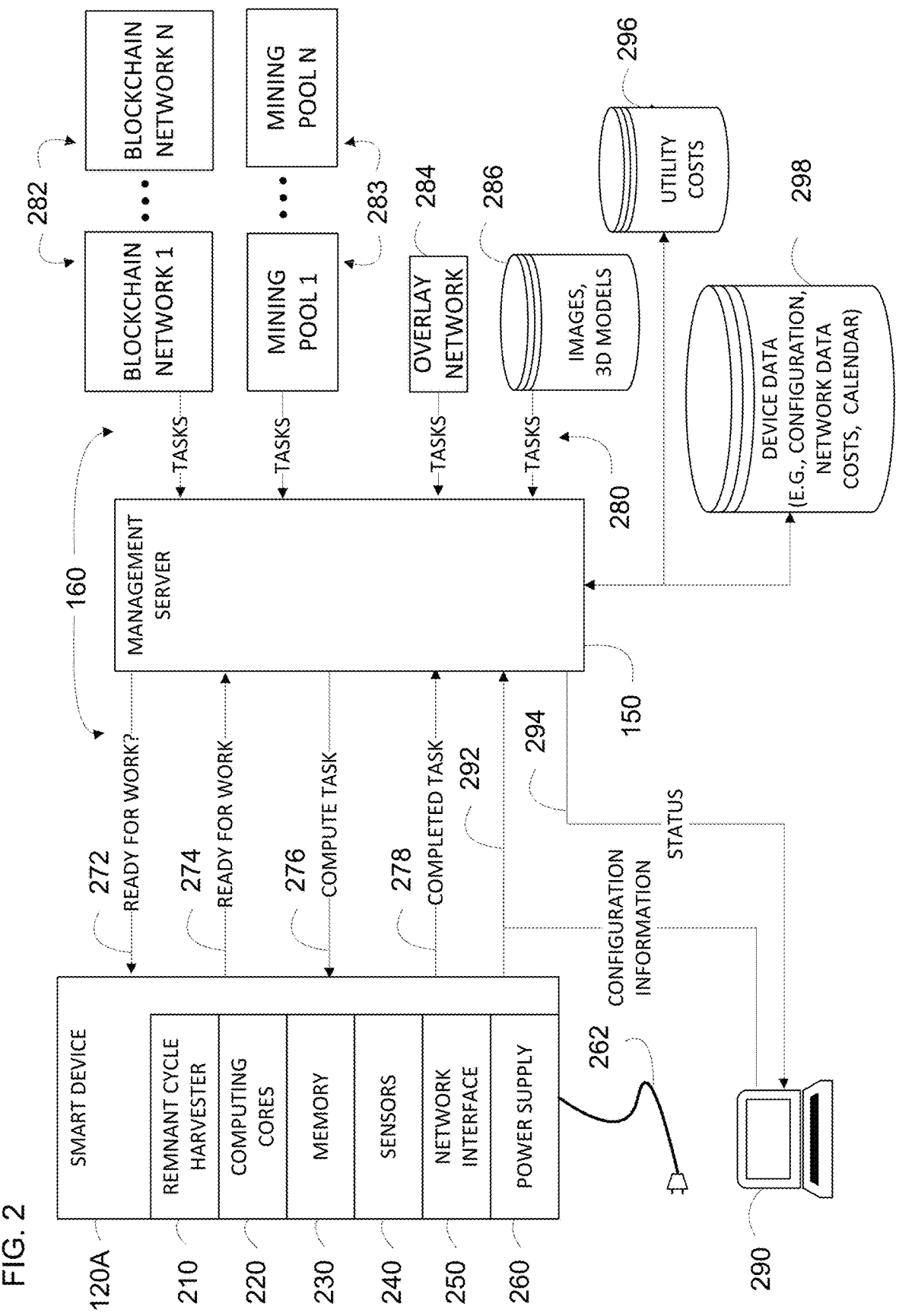
FIG. 2 is an illustration of additional details of one example embodiment of a system for harvesting remnant cycles in smart devices according to teachings of the present disclosure.

Referring now to FIG. 2, additional details of one example embodiment of a system for harvesting remnant cycles in embedded smart mobile devices are illustrated. In this embodiment, smart device 120A comprises a remnant cycle harvester 210, one or more computing cores 220, memory 230, sensors 240, network interface 250, and power supply 260. Remnant cycle harvester 210 is preferably implemented in software that is stored on non-volatile storage in smart device 120A and loaded into memory 230 and run by the operating system controlling smart device 120A after smart device 120A powers up. Remnant cycle harvester 210 may also be implemented in firmware that is loaded by smart device 120A at power-up, e.g., as part of its BIOS (Basic Input/Output System).

Computing cores 220 may be general purpose central processing units (CPUs) such as x86 or ARM computing cores, but preferably they may also include large numbers of specialized processing cores such as graphics processing units (GPUs), field programmable gate arrays (FPGAs), or application specific integrated circuits (ASICs). While general purpose CPUs are capable of performing the calculations necessary for processing compute tasks 276, GPUs, FPGAs, and ASICs may be significantly faster and more energy efficient when performing compute tasks 276, thereby increasing the utility of the system.

As noted above, smart device 120A is preferably configured with sensors 240 to enable autonomous or semi-autonomous operation including self-navigation, object detection, and collision avoidance. When in active operation, sensors 240 may capture data such as images or video into memory 230 for processing by computing cores 220. Smart device 120A is powered by power supply 260, preferably a high energy density battery pack. Smart device 120A may be configured to connect to mains power by charger 262, which may be a power cable from a charging station, a wired docking station, or even a wireless charging pad. Smart device 120A is configured to communicate with management server 150 via network interface 250 and network connection 160.

Management server 150 may be implemented in software running on a general-purpose computer, a server or cluster of servers, or in a dedicated appliance. Management server 150 is configured to send and receive messages via network connections 160. In one embodiment, management server 150 is configured to periodically send a "ready for work" query message 272 to smart device 120A to inquire as to whether smart device 120A is in a ready for work state. Smart device 120A may be configured to respond with one or more "ready for work" messages 274 if smart device 120A is available and ready to work on additional compute tasks. Ready for work messages 274 may include additional information about the current status of smart device 120A (e.g. the temperature of the ambient air by smart device 120A, the temperature of one or more components within smart device 120A, power supply 260 status, and smart device 120A's location).

The criteria for being in a ready to work state may include, for example, being stationary, being idle (e.g., below a predetermined threshold of utilization of computing cores 220), being connected to mains power, and/or having a fully charged or nearly fully charged battery pack. Additional criteria may include one or more temperature sensors in sensors 240 indicating that the ambient temperature around smart device 120A or the internal temperature of computing cores 220 is below a predetermined safe threshold temperature. Performing compute-intensive tasks on smart device 120A when the battery is not fully (or almost fully) charged may undesirably slow the rate of battery charging if power supply 260 is current limited. This could interfere with smart device 120A being ready to perform its primary purpose. Performing compute-intensive tasks on smart device 120A when the temperature is above a predetermined safe threshold temperature may cause undesirable thermal stress to the components of smart device 120A and may increase the probability of premature component failure. In some embodiments, the criteria for being in a ready to work state may also include one or more humidity sensors in sensors 240 reporting that the ambient humidity is below a predetermined threshold. As with high temperatures, operating with high humidity also may have negative effects on electronic components in smart device 120A. For example, long periods of operation in high humidity environments can decrease the insulation resistance in electrolytic capacitors that are commonly used in electronics such as power supply 260.

In some embodiments, remnant cycle harvester 210 may be configured to periodically send available for work messages 274 via network interface 250 to management server 150 when smart device 120A meets the predefined ready to work criteria. In some embodiments, these criteria are configured as part of the remnant cycle harvester 210 set up process on smart device 120A and may be updated by management server 150.

In some embodiments, remnant cycle harvester 210 may be configured to wait for ready for work query messages 272 from management server 150 before sending ready for work messages 274. In other embodiments, remnant cycle harvester 210 may defer the ready for work determination to management server 150. In these embodiments, the ready for work message 274 is always sent and preferably includes information about smart device 120A's status, including for example, processor utilization, battery and charging status, etc. In these embodiments, management server 150 may perform the determination of whether smart device 120A is truly idle and available for work.

In response to ready for work messages 274 (or after a subsequent ready for work determination as noted above), management server 150 may be configured to send selected compute tasks 276 to smart device 120A via network connections 160. Compute tasks 276 may be selected from one or more sources. For example, compute tasks 276 may be selected from one or more blockchain networks 282 or mining pools 283. One example of this type of compute task 276 is calculating hashes that meet a specified level of difficulty for the particular blockchain network 282. Another example is scrypt-based proof of work used by cryptocurrencies such as Litecoin. These types of compute tasks are common for cryptocurrency blockchain networks such as Bitcoin that are based on proof of work principles. Management server 150 may be configured to select compute task 276 directly from one or more blockchain networks 282 (e.g., Bitcoin, Ethereum, Litecoin) or indirectly through mining pools 283. Mining pools 283 share work and distribute rewards to members, often based on the amount of computation performed by each member. In one example embodiment, the management server 150 acts as its own Bitcoin mining pool and changes a value in the Bitcoin coinbase message for each smart device to which compute tasks are assigned. The compute tasks may for example include calculating SHA-256 hashes in an attempt to find a hash meeting a specific level of difficulty (e.g., less than a particular value specified by the particular blockchain network). In this embodiment, management server 150 may also be configured to allocate rewards received to smart device 120A based on the total amount of work performed by smart device 120A. This information may be stored and presented to remote client 290 on an aggregate or per individual smart device basis.

Other types of compute tasks 276 that management server 150 may send to smart device 120A include network packets for routing and encryption/decryption as part of an overlay network 284, e.g., using onion routing or other secure virtual private network (VPN) technique. Other examples of types of compute task 276 that management server 150 may send to smart device 120A are image processing tasks such as object detection, rendering (e.g., ray tracing) of 3D models, or computations related to DNA sequencing. Management server 150 may be configured to forward (directly or via links) relevant data so that smart device 120A will have the information needed to perform compute task 276.

In response, smart device 120A may be configured to perform the compute task 276 using computing cores 220 and memory 230 and to send the completed task 278 (e.g., results or processed data) back to management server 150 or to some other destination on network connections 160 that management server 150 designates. Management server 150 may be configured to forward the completed tasks 278 that it receives from smart device 120A (and other smart devices 120) to blockchain networks 282 or mining pools 283, or other destinations based on the type of compute task that is completed. Management server 150 may also be configured to combine the computed tasks 278 with those received from other devices.

Management server 150 may be configured to receive configuration information 292 from remote clients 290 (e.g., via a web browser interface) and or directly from smart device 120A. Example configuration information 292 includes information about smart device 120A such as the device type (e.g., manufacturer and model number), the type and number of computing cores 220, battery status, whether or not smart device 120A is connected to mains power, the location of smart device 120A, the temperature of smart device 120A (either internal component temperature or ambient temperature), the humidity near smart device 120A, utility costs at the location of smart device 120A, and any network costs that smart device 120A incurs for using network connections 160. Configuration information 292 may also include an availability calendar to expressly prevent smart device 120A from performing compute tasks during certain times regardless of idle status. For example, if the owner of smart device 120A wants to ensure that no compute tasks are processed during certain times and days of the week (e.g., maintenance windows), those times could be entered via remote client 290. Maintenance server 150 may be configured to store configuration data in a local data store or in a local or remote database 298.

Utility costs may contribute significantly to whether certain compute tasks are viable (e.g., profitable or worth executing) on smart device 120A based on current location. Utility costs may be manually entered via remote client 290, directly on management server 150, or accessed from external networked data sources (e.g., a web service providing utility rates based on location). A database or table of stored utility rates 296 may be configured to be accessible by management server 150 locally or via network connections 160. Database 296 may be static or time-varying (e.g., updated in real-time or periodically), and may include information on different utility rates for each day of the week and time of day (e.g., off-peak rate schedules). In some embodiments, this information may be obtained directly from utility companies, or from the owner or lessee of smart device 120A (e.g., as entered on remote console 290), or by the administrator of management server 150 as entered locally.

Management server 150 may store or update this information in a local or remote database of utility costs 296. In some embodiments, smart device 120A is highly mobile and may be in different parts of the country at different times. Management server 150 may be configured to determine the applicable utility rates based on the smart device's 120A current location (as reported by the smart device 120A) and optionally the local time of day as well. Some utilities charge different rates at different times of the day and days of the week, so knowing the location and local time of smart device 120A may improve the accuracy of the cost determination made by management server 150 and improve the determination of whether the particular compute task is viable.

Network data costs may also contribute to whether certain compute tasks are viable (e.g., profitable or worth executing) on smart device 120A when at a particular location. For example, if smart device 120A is mobile, it may have free access to Wi-Fi in certain locations but not others. Network costs may be manually entered via remote client 290, directly on management server 150, or accessed via an external database of network costs and other configuration data 298. Management server 150 may be configured to determine the applicable network costs for smart device 120A based on the location of the smart devices (as reported by the smart device) 120. Some network provider offer plans with a specified amount of network data before charging extra fees. This information may also be provided to management server 150 directly or via remote client 290 and stored in a local or remote database of configuration information 298 and used in determining compute task viability.

Management server 150 may be configured to select viable compute tasks 276 to be sent to smart device 120A based on one or more of the following criteria: the type and number of computing cores 220 available on smart device 120A (e.g., estimated time required to complete the compute task); the estimated reward for completing the compute task 276; the estimated cost to complete compute task 276 on smart device 120A (based at least in part on utility costs 296); whether the estimated reward is greater than the estimated cost, and if so by how much; whether smart device 120A is available for compute tasks based on an availability calendar (e.g., stored as part of device configuration data 298); network attributes for the smart device, including for example network latency, available network bandwidth, and network data cost based on the device's location). For example, if the estimated reward is greater than the estimated cost of performing the compute task on computing cores 220 (e.g., given smart device 120A's current location and the utility rates for that location at the current time), and if the compute task can be completed in a specified amount of time (e.g., given the number and type of computing cores 220 in smart device 120A), then the compute task may be determined by management server 150 to be viable for smart device 120A.

In one embodiment, management server 150 may be configured to send compute tasks to smart device 120A to maximize overall system profits, e.g., by sending some compute tasks 276 that execute at a loss if the system (as a whole) benefits. For example, if completing all compute tasks within a predetermined deadline secures a reward R, executing some compute tasks at a loss L on smart device 120A may be warranted if R>>L.

In another embodiment, smart device 120A may apply some or all of these criteria to perform its own determination of whether or not to process compute task 276 once the task is received from management server 150. Management server 150 may be configured to provide some or all of the data needed for smart device 120A to make its own determination. For example, smart device 120A may perform its own calculation of cost or its own determination of whether the temperature is too high to safely perform compute task 276. Smart device 120A may be configured to report the reason or reasons for declining to perform compute task 276 to management server 150 in lieu of completed task 278. Management server 150 may be configured to store this information (e.g., in device data database 298) for later reporting to remote client 290.

Management server 150 may also be configured to provide a dashboard (e.g., to remote client 290) displaying operating status and statistics for smart device 120A, including for example, idle status, profit contributions, and time spent on computing tasks.

Figure 3:
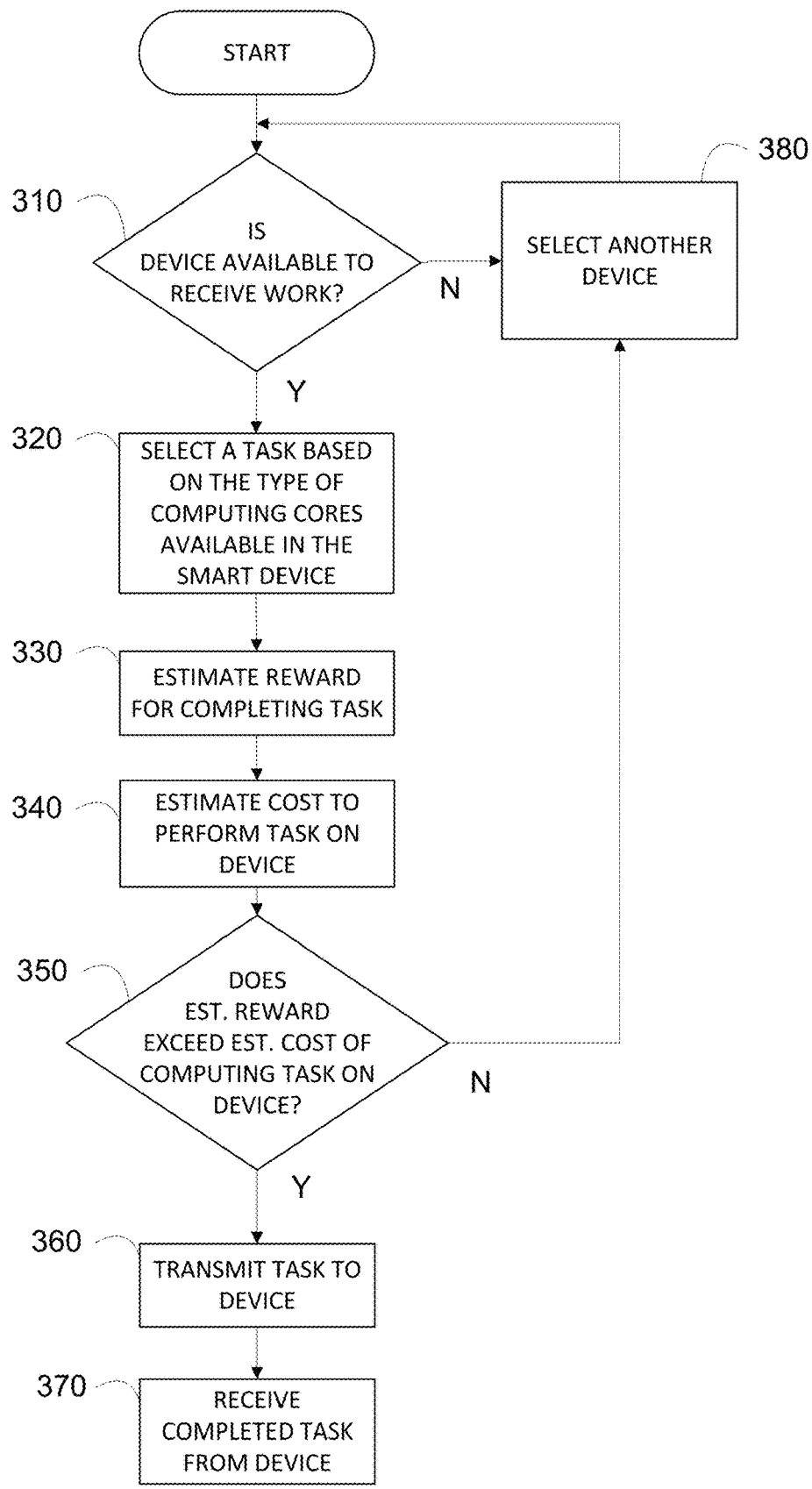
FIG. 3 is a flow chart of an example embodiment of a method for harvesting remnant cycles in smart devices according to teachings of the present disclosure.

Turning now to FIG. 3, one example embodiment of a method for harvesting remnant cycles in smart devices is illustrated. In step 310, management server 150 is configured to determine whether a particular smart device 120A, as shown in FIG. 2, is available to receive work, e.g., available to perform a viable compute task 276. In step 380, if the device is not available, another device from the set of smart devices 100, as shown in FIG. 1, is selected.

In step 320, management server 150, as shown in FIG. 2, is configured to select a compute task 276 for assessment of viability. In one embodiment, the compute task may be selected based on the type of computing cores 220 present in smart device 120A. For example, if computing cores 220 are GPUs, tasks particularly suited to GPUs (e.g., ASIC-resistant cryptocurrency mining like Vertcoin or Monero) may be selected. If FPGAs are present, management server 150 may be configured to convey Verilog or VHDL (VHSIC Hardware Description Language, where VHSIC stands for Very High Speed Integrated Circuit) to smart device 100 along with the compute task 276 in order to configure the FPGA to efficiently execute it.

In step 330, management server 150 or smart devices 100 determine the reward for completing the task. In some embodiments, this reward may be based on estimates from the data source providing the compute tasks (e.g. a blockchain network or cryptocurrency mining pool). In some embodiments, the reward may be estimated or calculated based on this data using a formula such as Equation 1.

$$\text{reward} = \frac{50}{\text{difficulty}} \times \frac{\text{hashrate} \times \text{time period}}{2^{32}} \quad \text{Equation 1}$$

The hashrate may be based on a lookup table of premeasured hashrates based on the number and type of core in computing cores 220. Or in another embodiment, as part of initial configuration, management server 150 may be configured to have each of smart devices 100 execute a small initial set of compute tasks (e.g., calculate hashes for a predetermined amount of time) in order to determine the hashrate value for that device. The difficulty value in Equation 1 may, for example, be obtained periodically from the particular cryptocurrency network for which the compute task is intended, as these values may change over time.

In step 340, management server 150 is configured to estimate the cost to execute compute task 276 on the particular smart device 120A. Energy cost is typically a significant contributor to this cost, and in one embodiment this is calculated according to Equation 2.

$$\text{energy cost} = \text{time required to complete} \quad \text{Equation 2}$$
$$\text{(in seconds)} \times \text{power usage while calculating}$$
$$\text{(in watts)} \times \text{utility cost (in kilowatt hours)} \times \frac{1 \text{ hour}}{3600 \text{ sec}}$$

In step 350, management server 150 is configured to determine whether the estimated, calculated, or actual rewards exceed the estimated, calculated, or actual cost to execute on the selected smart device 120A. If the reward exceeds the cost, the compute task 276 is determined to be viable. If the rewards do not exceed the cost, compute task 276 may be determined to not be viable for the selected smart device 120A, and another one of smart devices 100 is selected in step 380.

If viable, in step 360 management server 150 is configured to send the viable compute task 276 to selected smart device 100 for execution. In step 370, once compute task 276 is completed, selected smart device 120A sends the results of the completed task 278 back to management server 150 (or to another appropriate destination such as a blockchain network 282 or mining pool 283).

In some embodiments, viability may also depend on other criteria, (e.g., rewards may need to exceed costs by a predetermined threshold to account for wear and tear on smart device 120A, transaction costs associated with currency conversions, or taxes).

Figure 4:
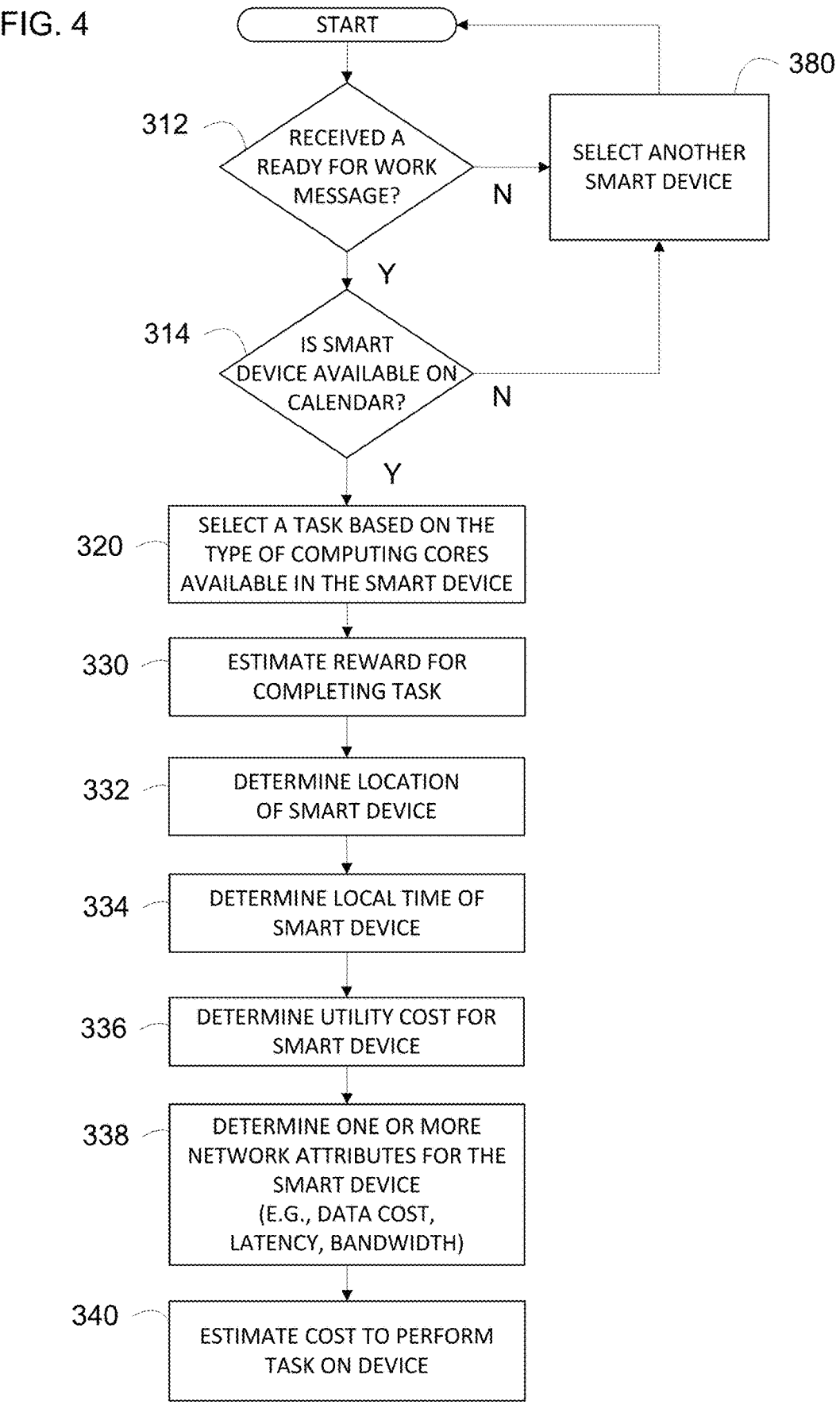
FIG. 4 is a flow chart illustrating details of another example embodiment of a method for harvesting remnant cycles in smart devices according to teachings of the present disclosure.

Turning to FIG. 4, another embodiment of the method illustrated in FIG. 3 is shown. In this embodiment, step 310 from FIG. 3 is replaced with steps 312 and 314. In step 312, management server 150 is configured to select another one of smart devices 100 if a ready to work message has not been received from the selected smart device 120A. Management server 150 may be configured to periodically query smart devices 100 as to their status, or smart devices 100 may be configured to periodically send ready for work status messages when they are idle (i.e., without being queried by management server 150).

This embodiment further comprises step 332-338. In step 332, management server 150 is configured to determine the location of the selected smart device 120A. This may be accomplished for example by accessing static location information provided via remote client 290 during initial setup. In another embodiment, the selected smart device 120A may provide its location information to management server 150 (e.g., as part of ready to work message 274) based on GPS. Or management server 150 may be configured to determine the location based on the network address information in ready to work message 274.

In step 334, management server 150 may be configured to determine the local time applicable to the current location of the selected smart device 120A. In step 336, management server 150 may be configured to determine the utility cost based on the local time. In step 338, the management server 150 may be configured to determine one or more network attributes for the smart device that may also be used to determine the cost and whether or not compute task 276 is viable for the selected smart device 120A. For example, any network data costs may be added to the total estimated cost of executing the task. Additional factors such as network latency and bandwidth limitations may also be used to determine whether a task is viable. Some compute tasks 276 may require lower latencies (e.g., overlay network operations involving real-time audio or video). Similarly, some compute tasks 276 may require significant bandwidth (e.g., processing high definition video data). As smart device 120A may move over time, and network connections 160 may vary over time, these network attributes may be measured by management server 150 as part of step 338. The information from steps 332-338 are then used in step 340 to estimate the cost to perform the compute task on smart device 120A and then proceed with the remaining steps from the embodiment illustrated in FIG. 3.

Figure 5:
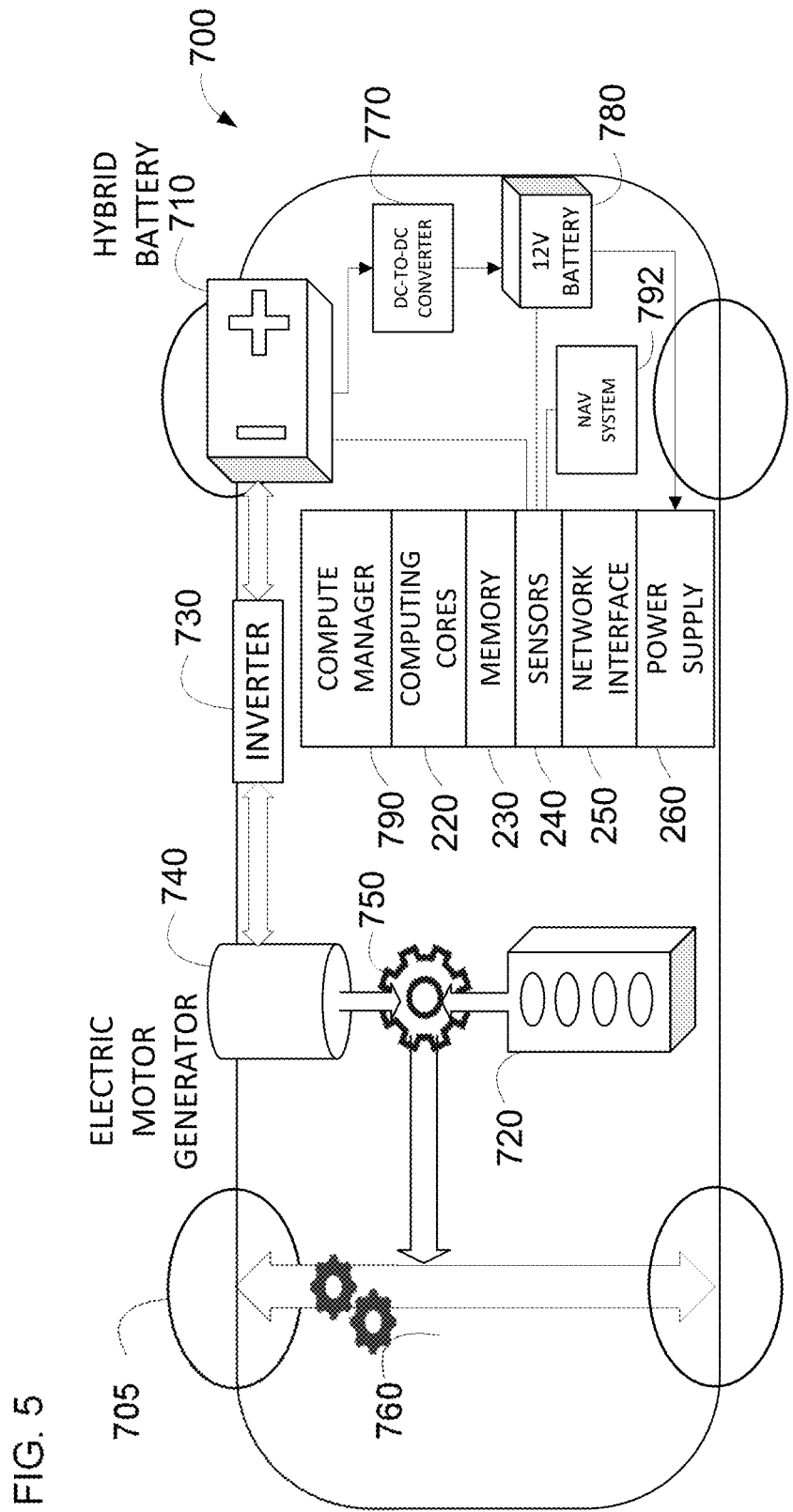
FIG. 5 is an illustration of an example embodiment of a vehicle according to teachings of the present disclosure.

Turning now to FIG. 5, one embodiment of a vehicle 700 configured for efficient (e.g., economical) computing is shown. In this example, vehicle 700 includes a battery 710 used for electric propulsion and an internal combustion engine (ICE) 720. ICE 720 is connected to power split device 750 that transfers power from the ICE 720 and an electric motor generator 740 to a transmission 760 that drives wheels 705. When accelerating, ICE 720 and or motor generator 740 drive power split device 750, which in turn drives transmission 760 and wheels 705. When braking, the reverse occurs, and motor generator 740 converts kinetic energy from vehicle 700 into electrical energy that is stored in battery 710 via electric inverter 730. In some embodiments, a lower voltage battery 780 is also included that is charged from hybrid battery 710 via a DC-to-DC converter 770. The lower voltage battery 780 is often used for powering accessories, including lights, displays, infotainment systems, onboard navigation system 792, and electronic components including sensors 240 and computing cores 220 (e.g., used for self-parking or self-driving). Many embodiments also include memory 230 to store data from wireless network interface 250 and from sensors 240, including navigation data from navigation system 792 and battery charge levels from batteries 710 and 780. In some embodiments, braking may include motor generator 740 operating as a generator during coasting (i.e., neither accelerator nor brake pedals are pressed). Vehicle 700 may be a passenger car, truck, or other vehicle that has the ability to generate power from otherwise unused kinetic energy.

In one embodiment, vehicle 700 includes a compute manager 790 that communicates (via network interface 250) with external sources having compute tasks that need to be executed. In contrast to internal processing tasks that computing cores 220 might perform for vehicle 700 operation such as image processing for self-parking, the compute tasks received by compute manager 790 via network interface 250 from external sources are not related to the vehicle's operation. Instead, they are compute tasks associated with external workloads such as the examples noted above, including for example proof of work processing for blockchain networks, encryption processing for overlay networks, image processing, 3D model rendering, or computations related to DNA sequencing. Other types of compute tasks that are compute-intensive are also possible and contemplated. Compute manager 790 may be configured to cause the compute task to be executed by computing cores 220 if battery 710 and/or battery 780 are above a predetermined threshold. In one example embodiment, this predetermined threshold is 80 percent or 90 percent of capacity, but other thresholds are possible and contemplated. For example, in another embodiment, the threshold is the standard "full" charge level of battery 710. Note that in some implementations a "full" battery does not equal maximum charge, as some types of battery 710 will have a longer service life if they are not charged to their absolute maximum and not discharged to their absolute minimum. As noted earlier, the completed compute tasks may be transmitted back via a wireless network to their source for recognition and collection of a reward.

Compute manager 790 may be implemented in software, firmware, or hardware. For example, in one embodiment compute manager 790 is a software module stored in a non-volatile memory and loaded into memory for execution by a control processor (e.g., CPU) in vehicle 700 or by computing cores 220.

Figure 6:
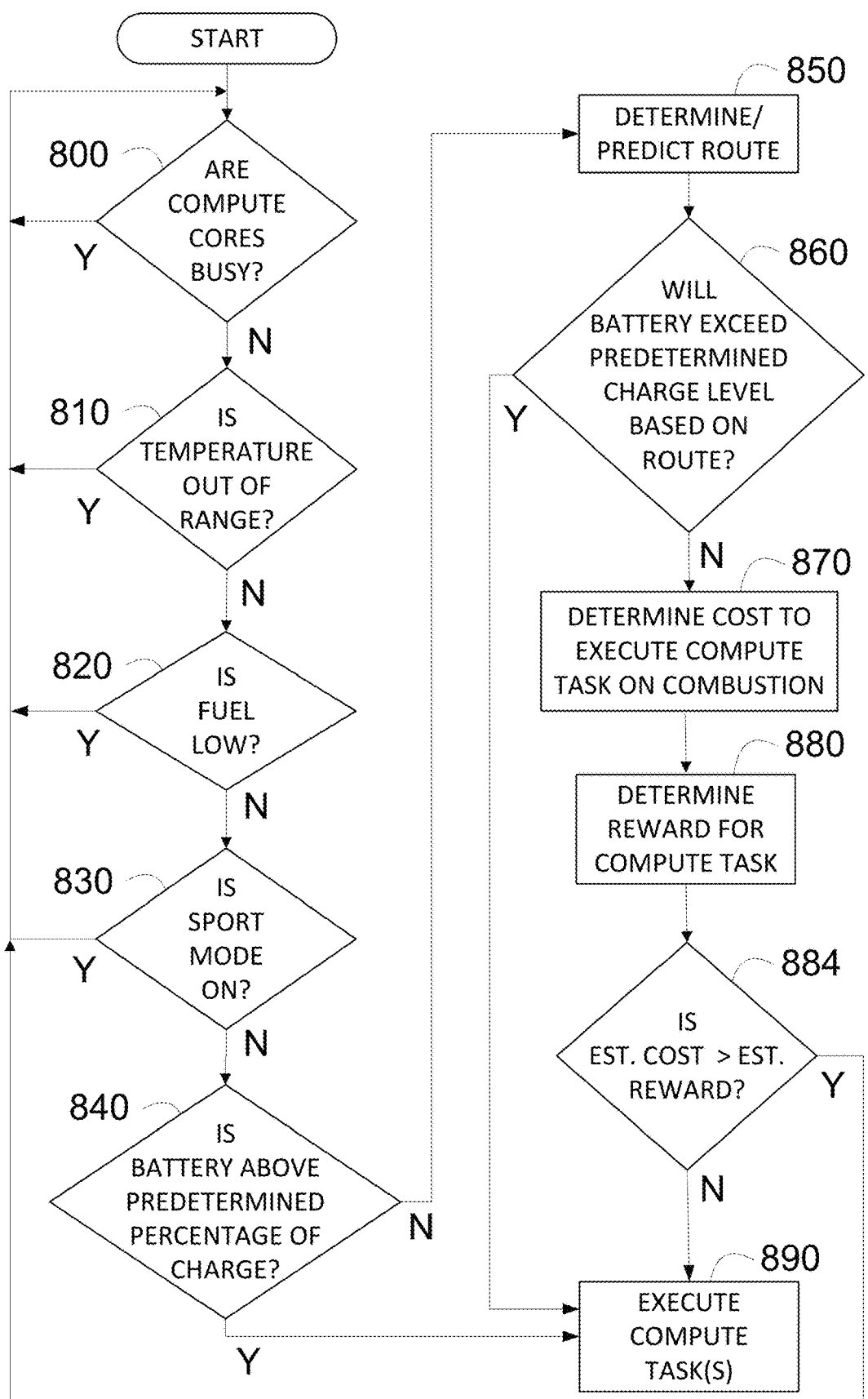
FIG. 6 is a flow chart of an example embodiment of a method for efficient computing in a vehicle in according to the teachings of the present disclosure.

Turning now to FIG. 6, an example embodiment of a method for efficient computing in an electric or hybrid vehicle is shown. This method could, for example, be implemented in compute manager 790 described above. In one embodiment, the method begins with receiving a computing task and determining if the vehicles compute resources are busy (step 800). For example, if the vehicle is actively parking or currently requires all of its compute resources for self-driving, it may be busy and not execute the external compute tasks. If the compute cores are not busy, the temperature may be checked to determine if it is in a safe operating range (step 810). Executing compute tasks can generate excess heat, and if the current temperature is too high or too low, this could negatively impact the lifespan of the computing cores. Similarly, in some embodiments if fuel is low (step 820) or a performance or sport mode is engaged (step 830), it may be desirable to not execute the compute tasks.

In one embodiment, if the battery is above a predetermined threshold (step 840), the compute task or tasks are executed (step 890). For example, if the battery is full or nearly full, then it is likely that additional energy captured from braking would go to waste, so executing compute tasks would likely result in efficient processing of those tasks.

In another embodiment, the method includes determining or predicting the current route of the vehicle (step 850). The route may be obtained from a destination entered into the vehicle's navigation system, or by examining past driving history. For example, the route may be predicted by attempting to match prior trips with the current one based on the day of the week, the time of day, the vehicle's current position, the vehicle's current driving direction, and the vehicle's current driver (based on face recognition if available, the particular key used, or even the vehicle's seat position). If based on the current position and route, the vehicle will exceed a predetermined battery charge level (step 860), then this data can be indicative of potentially wasted energy that can be beneficially utilized by executing the compute tasks (step 890).

In some embodiments implemented in hybrid vehicles, an incremental cost to execute the compute tasks using energy that is generated or replenished by the vehicle's ICE is determined (step 870) along with an estimated reward for completing the compute task (step 880). These values may be compared (step 884) and viable tasks may be executed (step 890). The vehicle's current position, fuel efficiency along the current route, and the fuel costs along the current route may be used to determine the cost for executing the compute tasks and replenishing that battery charge with the ICE. As the reward and fuel costs may change frequently, this information is preferably updated via wireless network to ensure the data for these determinations is reasonably accurate.

Figure 7:
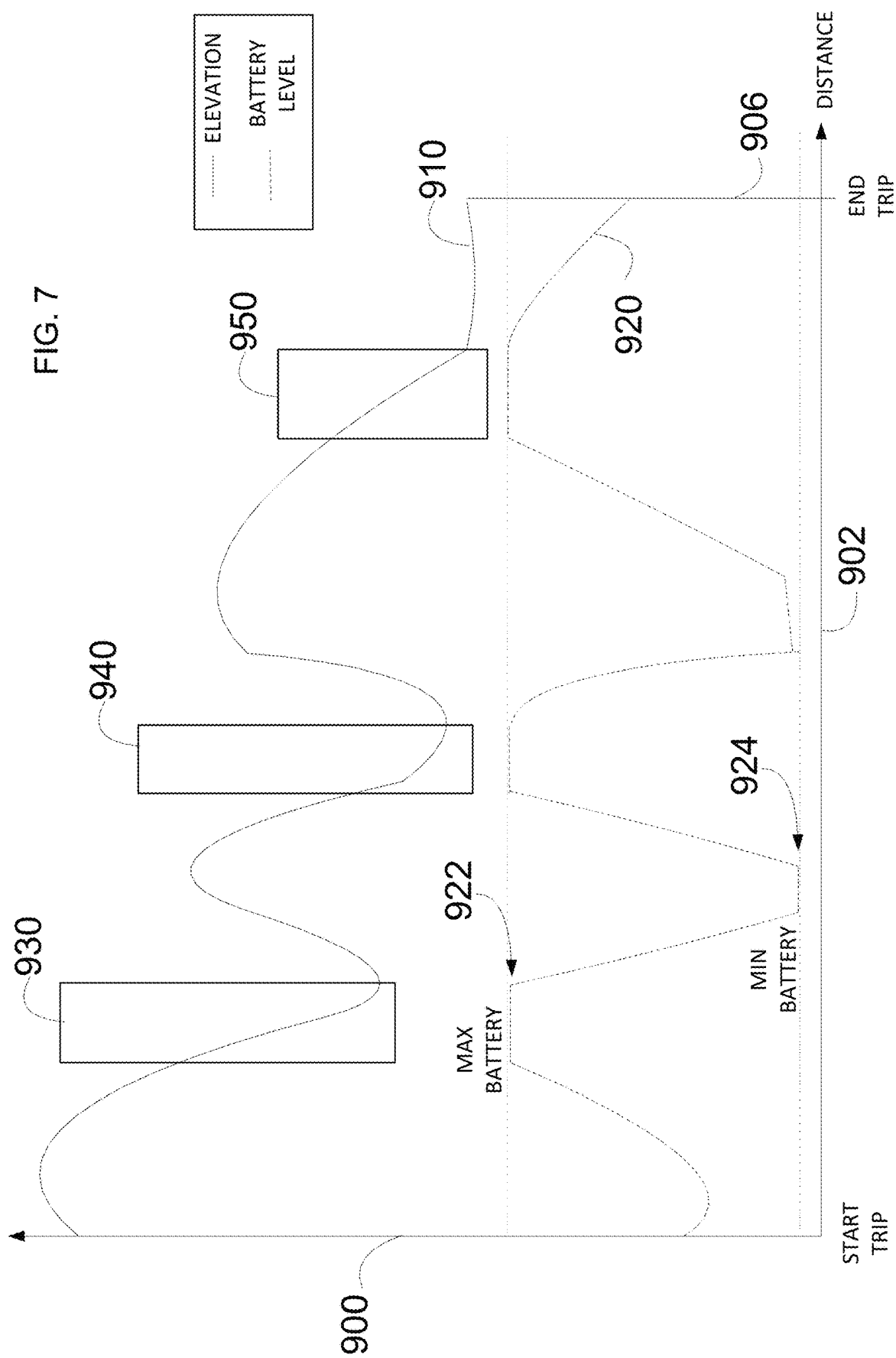
FIG. 7 is a chart illustrating an example of efficient computing according to the teachings of the present disclosure.

Turning to FIG. 7, a chart is provided illustrating an example battery level curve 920 for a vehicle traveling on a route from staring point 900 to ending point 906 with a given elevation curve 910. The vehicle's battery charge level will hit maximum charge level 922 and minimum charge level 924 at several points on this route. Once maximum battery charge level 922 is hit, any additional energy that could be captured would be wasted. In one embodiment, compute tasks are executed during time periods 930, 940 and 950 after the battery reaches its maximum charge level 922 to make beneficial use of the energy that would otherwise be wasted.

Figure 8:
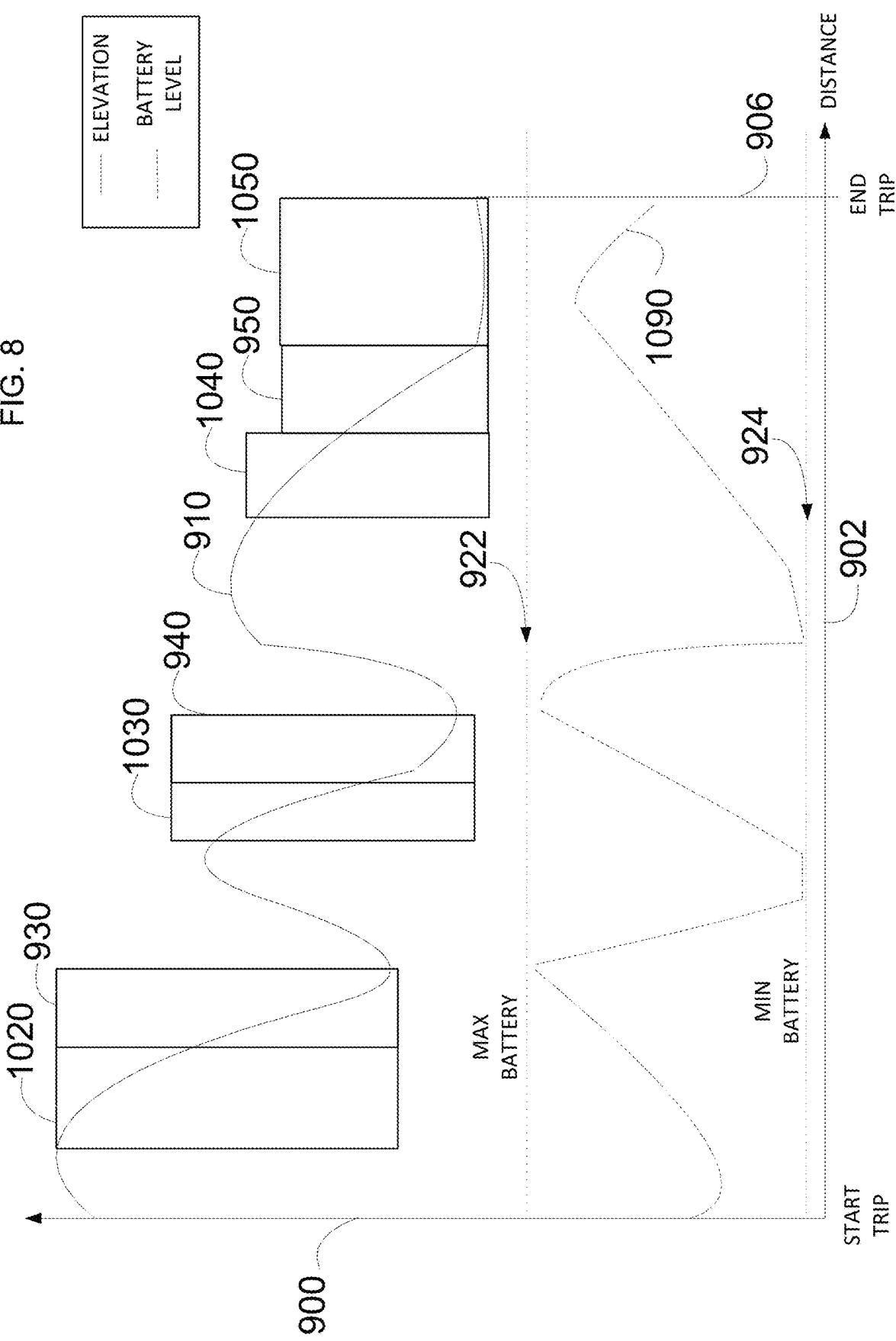
FIG. 8 is a chart illustrating another example of efficient computing according to the teachings of the present disclosure.

Turning to FIG. 8, a chart illustrating another example of efficient computing is shown. In this example, by determining the current route of the vehicle, more compute tasks are able to be efficiently executed. This is accomplished by starting execution earlier, e.g., during time periods 1020, 1030, and 1040. In this embodiment, if a predetermined threshold battery charge level (e.g. max battery level 922 in this example) is predicted to be met or exceeded based on the current charge level and the current route, then compute tasks may be beneficially executed. In some embodiments, the rates of increase and decrease in battery charge level used in this prediction may be determined using the vehicle's past battery charge and discharge data for routes having similar posted speed limits and elevation changes to the current route. Additional factors such as the level of traffic on the current route, the ambient temperature, altitude, heating and air conditioning system settings, and even window positions may also be used in some embodiments to improve the accuracy of the estimated rate of increase and decrease in battery charge level.

In some embodiments, if the end point of the route is known to have a charging point (applicable for electric and plug-in hybrid vehicles), then the compute tasks may be executed if the vehicle is predicted to have more than a predetermined threshold (e.g., 25%) of battery charge remaining after providing for propulsion to the end point (time period 1050). In vehicles capable of plug-in charging, the energy used for computation is then effectively replaced by charging the vehicle at the route end point. In some embodiments, the utility rates in effect at the end point may be used to determine whether it is cost-effective to execute the compute tasks during time period 1050. Note that time periods 930-950 and 1020-1050 can also be thought of as route segments or trip segments, since computation could occur during these portions of the current trip. Battery charge level curve 1090 shows the battery charge level varying between maximum charge level 922 and minimum charge level 924 and not plateauing at maximum charge level 922 as a result of executing additional compute tasks during time periods 1020, 1030 and 1040. Battery charge level curve 1090 also illustrates that the battery charge level partially depletes at the end of the trip as a result of performing additional compute tasks during time period 1050.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A vehicle capable of efficient computing, the vehicle comprising:
   a battery having a charge level;
   an electric motor generator that:
      uses the battery to propel the vehicle during acceleration, and
      charges the battery during braking;
   a computing core,
   a network interface, and
   a compute manager that:
      receives a compute task that is not related to the vehicle's operation from the network interface, and
      causes the computing core to execute the compute task if the battery's charge level exceeds a predetermined threshold.

2. The vehicle of claim 1, wherein the compute task comprises blockchain proof of work calculations.

3. The vehicle of claim 1, wherein the compute manager is configured to:
   determine a current route for the vehicle; and
   cause the computing core to execute the compute task if the battery's charge level will exceed the predetermined threshold based on the current route without executing the compute task.

4. The vehicle of claim 3, wherein the compute manager is configured to:
   determine whether the current route ends in a destination that is a charging point for the vehicle; and
   cause the computing core to execute the compute task if the battery's charge level is above a predetermined ending threshold beyond the charge level needed to propel the vehicle to the current route end point.

5. The vehicle of claim 3, wherein the compute manager is configured to:
   determine a predicted reward for completing the compute task;
   determine a predicted incremental fuel cost for completing the compute task based a current location of the vehicle; and
   cause the computing core to execute the compute task if the predicted reward exceeds the predicted incremental fuel cost.

6. The vehicle of claim 4, further comprising:
   a management server configured to select the compute tasks for transmission to the compute manager, and wherein the compute manager is configured to transmit a result for the compute task to the management server.

7. The vehicle of claim 3, wherein the compute manager is configured to:
   prevent the computing core from executing the compute task if the vehicle has below a predetermined threshold of fuel.

8. The vehicle of claim 3, wherein the compute manager is configured to:
   prevent the computing core from executing the compute task if the vehicle has a performance mode that is set to a high-performance mode.

9. A method for efficient computing in an electric or hybrid vehicle having a battery and a compute core, the method comprising:
   receiving a compute task that is not related to the vehicle's operation from a network that is external to the vehicle;
   determining if the vehicle's battery is above a predetermined threshold level of charge;
   executing the compute task on the compute core if/to the extent the vehicle's battery is above the predetermined threshold level of charge; and
   transmitting the results of the compute task to the network.

10. The method of claim 9, further comprising selecting the compute task from a plurality of blockchain networks based on a predicted reward.

11. The method of claim 9, further comprising:
    determining a current route for the vehicle;
    determining whether the battery's charge level will exceed the predetermined threshold based on the current route; and
    causing the computing core to execute the compute task if the predetermined threshold will be exceeded without executing the compute task.

12. The method of claim 11, further comprising:
    determining whether the current route ends in a destination that is a charging point for the vehicle; and
    causing the computing core to execute the compute task to the extent the battery is predicted to have excess charge beyond that needed to propel the vehicle to the current route end point.

13. The method of claim 11, further comprising:
    determining an estimated reward for completing the compute task;
    determining a current estimated fuel cost to perform the compute task based on a current location of the vehicle; and
    performing the compute task on the compute core if the estimated reward is greater than the current estimated fuel cost.

14. The method of claim 9, further comprising:
    receiving the compute task from a management server, and
    transmitting a result for the compute task to the management server.

15. The method of claim 9, further comprising:
    preventing the computing core from executing the compute task if the vehicle has below a predetermined threshold of fuel.

16. The method of claim 9, further comprising:
    preventing the computing core from executing the compute task if the vehicle has a performance mode that is set to a high-performance mode.

17. A computing system for efficient computing in an electric or hybrid vehicle having a battery, the system comprising:
    a computing core;
    a network interface;
    a compute manager configured to:
       receive compute tasks not related to the vehicle's operation from the network interface, and
       instruct the computing core to execute the compute task if a charge level of the battery exceeds a predetermined threshold.

18. The vehicle of claim 1, wherein the compute task comprises at least one of:
    encryption/decryption and/or routing of network packets as part of an overlay network;
    object detection;
    3D model rendering; and
    DNA sequencing computations.

19. The vehicle of claim 5, wherein the predicted reward is financial compensation and/or currency.

20. The method of claim 9, wherein executing the compute task includes at least one of:
  performing blockchain proof of work calculations;
  performing scrypt-based proof of work calculations;
  calculating hashes that meet a specified level of difficulty for a particular blockchain network;
  processing an image;
  rendering a 3D model; and
  performing DNA sequencing computations.

* * * * *